United States Patent
Hagin-Metzer et al.

(10) Patent No.: US 7,426,392 B2
(45) Date of Patent: Sep. 16, 2008

(54) SEARCH RECEIVER USING ADAPTIVE DETECTION THERESHOLDS

(75) Inventors: Tsofnat Hagin-Metzer, Nes-Ziona (IL); David Ben-Eli, Modiin (IL)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 10/154,948

(22) Filed: May 23, 2002

(65) Prior Publication Data

US 2003/0220120 A1  Nov. 27, 2003

(51) Int. Cl.
*H04Q 7/20* (2006.01)
(52) U.S. Cl. .................. 455/436; 455/442; 370/331
(58) Field of Classification Search ............. 455/456.1, 455/67.11, 67.13, 436–442, 434; 370/335, 370/342, 331; 375/267, 260, 346, 347, 348, 375/349, 147, 148
See application file for complete search history.

(56) References Cited

U.S. PATENT DOCUMENTS

| | | | |
|---|---|---|---|
| 6,229,842 B1 * | 5/2001 | Schulist et al. | 375/148 |
| 6,275,186 B1 * | 8/2001 | Kong | 342/363 |
| 6,466,606 B1 * | 10/2002 | Jou | 375/130 |
| 6,510,143 B1 * | 1/2003 | Bejjani et al. | 370/320 |
| 6,560,209 B1 * | 5/2003 | Alamouti et al. | 370/330 |
| 6,580,749 B1 * | 6/2003 | Miura | 375/147 |
| 6,625,132 B1 * | 9/2003 | Boettger et al. | 370/329 |
| 6,745,034 B2 * | 6/2004 | Wang et al. | 455/441 |
| 6,801,511 B2 * | 10/2004 | Park | 370/331 |
| 6,894,996 B2 * | 5/2005 | Lee | 370/337 |
| 6,915,076 B1 * | 7/2005 | Mittal et al. | 398/38 |
| 6,961,398 B2 * | 11/2005 | Dick et al. | 375/356 |
| 2002/0114378 A1 * | 8/2002 | Yue | 375/136 |

OTHER PUBLICATIONS

Fukumoto, S., et al., "Matched filter-based Rake combiner for wideband DS-CDMA mobile radio", *IEICE Trans on Communications*, E81-B(7), (Jul. 1998), 1384-1390.

Fukumoto, S., et al., "Path search performance and its parameter optimization of pilot symbol-assisted coherent Rake receiver for W-CDMA mobile radio", *IEICE Trans. Fundamentals*, vol. E83-A, No. 11, (2000),2110-2119.

* cited by examiner

*Primary Examiner*—Edward Urban
*Assistant Examiner*—Raymond S. Dean
(74) *Attorney, Agent, or Firm*—Schwegman, Lundberg & Woessner, P.A.; Gregory J. Gorrie

(57) ABSTRACT

A search receiver within a wireless communicator uses an adaptive path detection threshold. By using a continually updated path detection threshold, a communicator may be adapted to the energy of a base station. A search receiver continually updates the path detection threshold to reduce a false alarm rate and enhance the accuracy of the search detector.

7 Claims, 2 Drawing Sheets

SEARCH RECEIVER USING ADAPTIVE DETECTION THERESHOLDS

BACKGROUND OF THE INVENTION

Communicators within wireless communication systems are often required to search for one or more base stations within the system during normal operation. Often, a communicator will need to search for a number of different base stations simultaneously. During a search, a quality measure (e.g., total received energy) is often determined for the corresponding base station. The quality measure may then be used, for example, to make a base station handoff decision. As can be appreciated, it is generally desirable that the quality measure be estimated as accurately as possible. It is also generally desirable that the search process be performed in an efficient manner.

DETAILED DESCRIPTION

Figure 1:
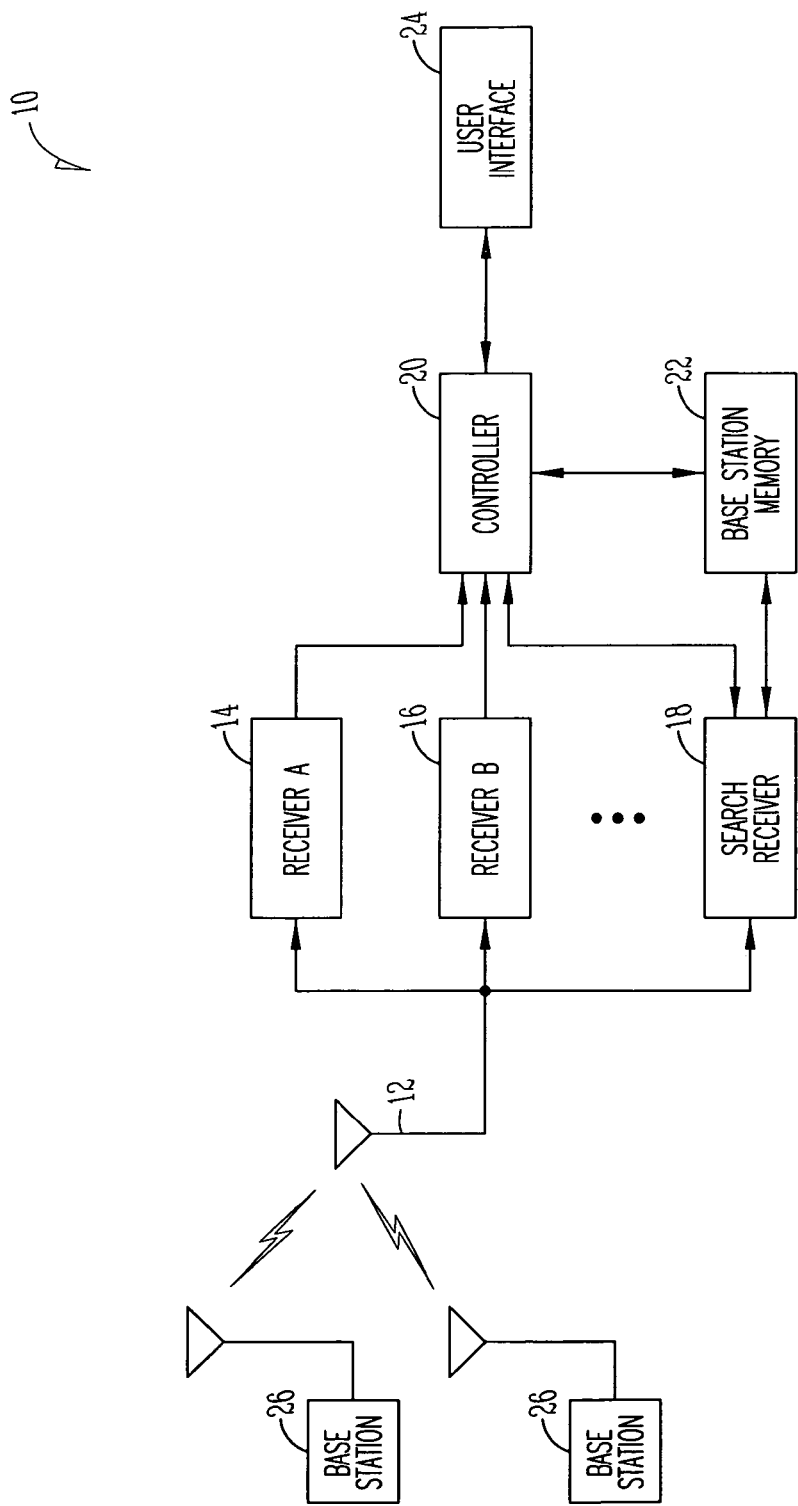
FIG. 1 is a block diagram illustrating a wireless communicator in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to methods and structures for performing base station searches in a wireless communicator using a variable path detection threshold. By using a variable path detection threshold, it is possible, for example, to adapt the communicator to a present received energy condition of the base station. In this manner, the search false alarm rate for the base station may be reduced and the accuracy of the search may be enhanced. In a communicator using a multi-dwell search receiver, the use of a variable path detection threshold may also reduce the search time, as the number of false hypotheses that will pass the initial dwell/dwells will often decrease. The inventive principles can be implemented in any form of wireless communicator that is required to search for one or more base stations. In at least one embodiment, the inventive principles are implemented within a communicator for use in a direct sequence spread spectrum based system (e.g., a code division multiple access (CDMA) system, a wideband code division multiple access (W-CDMA) system, etc.).

During a search for a base station in a wireless system, multiple different paths may be identified for the base station. Each of these paths can have a different energy level associated with it. To determine the total energy of the base station, the path energies are summed. However, all paths associated with the base station may not be used in the calculation of total energy. That is, in one approach, only those paths that exceed a path detection threshold are used in the summation. In the past, the path detection threshold was either a fixed threshold relative to the total input power received by the communicator, based upon a worst-case scenario, or it was calculated based on a base station report threshold specified by the corresponding network. The base station report threshold represents a total energy level to be exceeded by the sum of all paths from a base station before a communicator reports the base station to the network (this can be either a fixed threshold relative to the total input power or a dynamic threshold relative to the power received by the communicator from currently active bases). In conceiving the present invention, it was appreciated that the use of a fixed path threshold or a path threshold based upon a base station report threshold could lead to situations where a lower threshold was being used than was necessary. Thus, in at least one embodiment of the present invention, a path detection threshold is adapted during operation of a communicator based on a measured energy level associated with a corresponding base station.

FIG. 1 is a block diagram illustrating a wireless communicator 10 in accordance with an embodiment of the present invention. The wireless communicator 10 may be used, for example, within a CDMA-based communication system having a plurality of base stations that provide communication services to mobile users. The wireless communicator 10 may be implemented as any form of wireless communication device or subsystem including, for example, a cellular telephone, a personal digital assistant (PDA), a pager, a portable computer with wireless transceiver functionality, and others. As illustrated, the wireless communicator 10 includes: a receive antenna 12, one or more communication receivers 14, 16 (RECEIVER A, RECEIVER B), a search receiver 18, a controller 20, a base station memory 22, and a user interface 24. Although not illustrated, transmitter functionality may also be provided. It should be understood that the individual blocks illustrated in FIG. 1 (and other block diagrams described herein) are functional in nature and do not necessarily represent discrete hardware elements. For example, in at least one embodiment of the invention, one or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Full hardware implementations, hardware/software hybrid implementations, and other implementations may also be used. As will be appreciated, the inventive principles may also be implemented within communicators having architectures other than the architecture illustrated in FIG. 1.

The receive antenna 12 is operative for receiving wireless signals from one or more remote base stations 26. The base stations 26 may be arranged in a cellular or a non-cellular configuration. The communication receivers 14, 16 may each be used to process communication signals from a corresponding one of the remote base stations. For example, at a particular time, receiver 14 may be configured to process signals received from an affiliated base station (i.e., a base station that is currently servicing the communicator 10) and receiver 16 may be configured to process signals from a base station to which a handoff may subsequently occur. The base stations to which the communication receivers 14, 16 correspond may change with time, particularly when the wireless communicator 10 is in motion. The communication receivers 14, 16 may include rake receiver functionality to process signals from corresponding base stations. The search receiver 18 searches for base stations within range of the wireless communicator 10 using signals received by the antenna 12 (typically base station pilot signals). The search receiver 18 assembles information about the detected base stations and stores this information within the base station memory 22. This information may then be used to select, for example, an appropriate base station for call handoff. During an active call, the communicator 10 will normally report its search results to the network and let the network make any handoff decisions. The network then transmits the handoff information back to the communicator 10. The handoff decision is normally autonomous during idle mode.

The user interface 24 provides for communication between the wireless communicator 10 and a user thereof. In this regard, the user interface 24 may include any of a wide variety of different input and output functionality including, for example, a speaker, a microphone, a keypad, a liquid crystal display or touch screen, data conversion functionality, and/or others. The specific types of functionality within the user interface 24 will typically depend upon the type of information being handled by the communicator 10 (e.g., data, voice, video, etc.). The controller 20 is operative for controlling the operation of the receivers 14, 16, 18 and the user interface 24 within the communicator 10. The controller 20 also controls the flow of information between the receivers and the user interface 24. As shown, the controller 20 will typically have access to the information within the base station memory 22.

Figure 2:
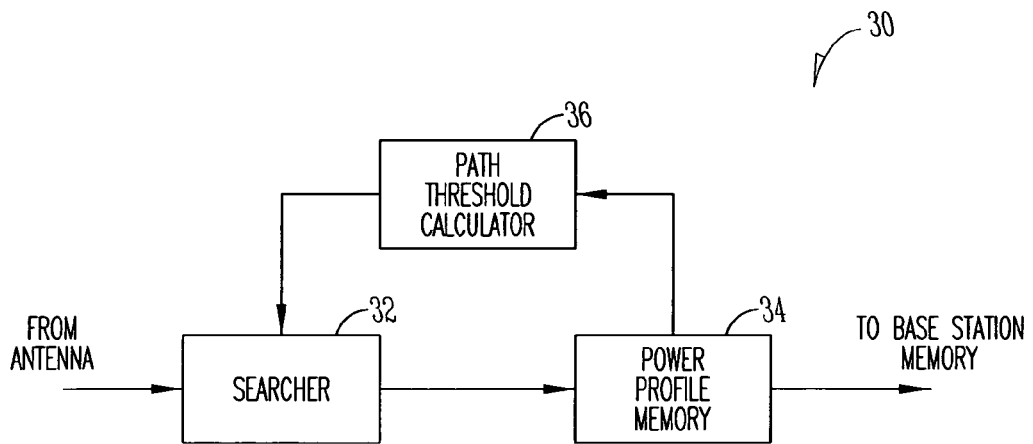
FIG. 2 is a block diagram illustrating functionality within a search receiver in accordance with an embodiment of the present invention.

FIG. 2 is a block diagram illustrating functionality within a search receiver 30 in accordance with an embodiment of the present invention. As illustrated, the search receiver 30 includes: a searcher 32, a power profile memory 34, and a path threshold calculator 36. When operating in a multipath environment, the signal received by a wireless communicator will typically include a plurality of multipath components (e.g., pilot signal components, etc.) for each received base station. For a particular base station, the searcher 32 processes the received signal using a time-based window associated with the base station. The time-based window allows multipath components associated with the base station to be isolated. The searcher 32 compares each of the sensed multipath components associated with the base station to a path detection threshold. If the path energy exceeds the path detection threshold, the path is considered a "detected" path. If not, the path is considered undetected. Information about the detected paths of the base station is then stored in the power profile memory 34. The searcher 32 will typically store detected path information in the power profile memory 34 for each of a plurality of base stations of interest (i.e., the base stations currently being searched).

The path threshold calculator 36 is operative for generating path detection thresholds for individual base stations based on the information stored in the power profile memory 34. In this manner, path detection thresholds that adapt over time may be achieved. In one approach, for example, the path threshold calculator 36 may generate a path detection threshold for a base station that is a fixed ratio of (i.e., X decibels (dB) below) the total energy of the base station (i.e., the sum of the energies of the detected paths for the base station). In another possible approach, the path threshold calculator 36 may generate a path detection threshold for a base station that is a fixed ratio of the strongest detected path associated with the base station. In still another approach, the ratio between the path detection threshold and the total energy may be made dependent upon the total energy. In at least one embodiment, a limit is placed on how low the path detection threshold may go. For example, the path detection threshold may be selected as max (XdB below strongest path, worst case), where the max (A, B) operator returns the larger of the two operands and "worst case" is the minimum possible threshold value. Using such a criterion will prevent the detection threshold from being lowered too much (e.g., below the noise floor) for bases that are received at a very low level, thus reducing the likelihood of false alarm. As will be appreciated, other techniques for determining a path detection threshold for a base station using detected path information may alternatively be used.

In the above examples, the path threshold calculator 36 determines a path threshold value for a particular base station based on information stored in the power profile memory 34 for that base station. In at least one embodiment of the present invention, the path threshold calculator 36 also uses detected path information associated with other currently searched base stations to generate the path detection threshold value for a particular base station. In one approach, for example, the path threshold calculator 36 uses detected path information from all of the currently searched bases to generate thresholds for each base. If a multi-dwell searcher is used, the path threshold calculator 36 may output several threshold values for each dwell of each base station being searched.

In at least one embodiment, the inventive principles are implemented within a multi-dwell search receiver. For example, the search receiver 18 of FIG. 1 may be a multi-dwell search receiver. A search receiver reports the delay spread and energy of detected paths by performing a correlation between a received pilot signal and a spreading sequence at different time offsets. The correlation result for each tested time offset is called a hypothesis. A multi-dwell search receiver performs the search in stages. In the first stage, each hypothesis is tested using a "first dwell" correlation time and a "first dwell" detection threshold. Only hypotheses that pass the first dwell threshold will continue the correlation for the "second dwell" correlation time. Only hypotheses that pass the "second dwell" threshold will continue the correlation for the "third dwell" correlation time, and so on. The objective of a multi-dwell search receiver is to reduce the search time by performing the full dwell time search only on hypotheses that are strong enough to pass the initial dwell/dwells. The initial dwell threshold usually allows a higher false alarm probability than the later dwell thresholds. A "false hypothesis" is a hypothesis whose correlation value passed the detection threshold due to noise rather than signal. In a system where the path threshold is adaptive, the initial dwell/dwells false alarm probability will typically be reduced. Consequently, the total search time will typically be reduced, since fewer false alarm hypotheses will pass to subsequent dwells.

Figure 3:
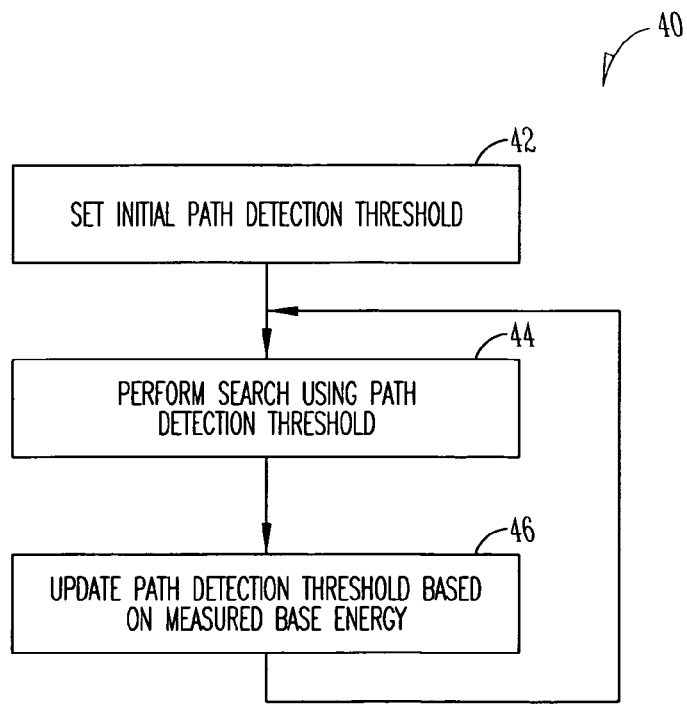
FIG. 3 is a flowchart illustrating a method for searching for a base station in accordance with an embodiment of the present invention.

FIG. 3 is a flowchart illustrating a method 40 for searching for a base station in accordance with an embodiment of the present invention. The method 40 may be implemented within, for example, a wireless communicator. The method 40 may be performed for each base station being searched by the communicator. Referring to FIG. 3, a path detection threshold may be initially set for the base station using, for example, a conventional method (e.g., based on a base station report threshold, a worst case threshold, etc.) (block 42). A search is next performed for the base station using the path threshold value (block 44). During the search, one or more paths may be detected for the base station (it is also possible that no paths will be detected). If one or more paths are detected, the path detection threshold may then be updated based on measured base energy (which may be determined using the detected path information) (block 46). In one possible approach, an updated path detection threshold is generated by multiplying an estimated total detected energy of the base station (i.e., the sum of the energies of all detected paths) by a predetermined factor. In another possible approach, an updated path detection threshold is calculated by multiplying the energy of the strongest detected path of the base station by a predetermined factor. Other techniques may alternatively be used. A minimum threshold value may also be specified below which the path detection threshold of a base station may not go. The detected path energies of other base stations may also be considered when updating the path detection threshold of the base station.

After the path detection threshold has been updated, another search may be performed using the updated path threshold (block 44). The path threshold may then be updated again based on the results of the new search (block 46). In this manner, the path detection threshold associated with the base station may be continually updated based upon the measured energy of the corresponding base station. When no paths are detected for a base station, the threshold may be held at a present value or it may be reset to some default value. It should be appreciated that a path threshold update does not need to be made every time that a search is performed. For example, in at least one embodiment, the path threshold is updated less frequently (e.g., after every third search, occasionally, etc.). The frequency at which updates are performed for a particular base station may be selected based upon the rate at which the total energy is expected to change for the base station.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A wireless communicator comprising:
   a first communication receiver configured to communicate with a first base station prior to a handoff;
   a search receiver; and
   a second communication receiver configured to communicate with a second base station after the handoff,
   wherein the search receiver comprises:
   a searcher configured to search for one or more base stations including the second base station by summing detected multipath components on a per base station basis received from the one or more base stations that exceed a variable path detection threshold and to refrain from summing multipath components received from the one or more base stations that do not exceed the variable path detection threshold;
   a power profile memory configured to store measured energy levels associated with the detected multipath components for each base station; and
   a path threshold calculator configured to dynamically vary the variable path detection threshold on a per base station basis over a plurality of searches for each of the base stations based on the measured energy levels stored in the power profile memory,
   wherein based on the stored measured energy levels associated with the detected multipath components for each base station, a handoff decision is made to cause the second communication receiver to communicate with the second base station and cause the first communication receiver to refrain from communicating with the first base station.

2. The wireless communicator of claim 1 wherein said multipath components include pilot signal portions of a base station signal,
   wherein the searcher identifies the second base station as a candidate base station for handoff based on the detected multipath components that exceeded the variable path detection threshold, and
   wherein after one or more searches, the path threshold calculator dynamically updates the variable path detection threshold for each base station on a per base station basis to exclude multipath components that do not significantly contribute to selection of a base station,
   wherein the searcher repeats searching for base stations using the updated path detection thresholds,
   wherein the path threshold calculator either refrains from updating the variable path detection threshold when no paths are detected for an base station, or resets the variable path detection threshold to a default value when no paths are detected for a base station, and
   wherein the path detection threshold is increased for greater measured energy and decreased for lower measured energy.

3. The wireless communicator of claim 2 wherein the measured energy level for each base station includes a total received energy estimate for each of the base stations determined by summing energies associated with the detected multipath components, and
   wherein the path threshold calculator dynamically varies said variable path detection threshold over time for each of the base stations based on the measured energy levels stored in the power profile memory for all base stations.

4. The wireless communicator of claim 2 wherein said measured energy level for each base station includes an energy level associated with a strongest multipath component detected for each identified base station, and
   wherein the path threshold calculator dynamically varies the variable path detection threshold for each base station by multiplying the energy level associated with the strongest multipath component detected for a base station by a predetermined factor.

5. The wireless communicator of claim 2 wherein:
   said search receiver is a multi-dwell search receiver which reduces search time by refraining from searching using multipath components received from the one or more base stations that do not exceed the variable path detection threshold and performing subsequent searching using multipath components received from the one or more base stations that exceed the variable path detection threshold.

6. The wireless communicator of claim 2 wherein the second communication receiver communications with the second base station after the second base station is selected for handoff by the search receiver and just prior to handoff concurrently with the first communication receiver communicating with the first base station, and wherein the first and second communication receivers are coupled to a common receive antenna.

7. The wireless communicator of claim 2 wherein:
said path threshold calculator dynamically varies the variable path detection threshold for each base station for one or more searches by multiplying a total measured energy value for each base station by a predetermined factor.

* * * * *

UNITED STATES PATENT AND TRADEMARK OFFICE
CERTIFICATE OF CORRECTION

PATENT NO. : 7,426,392 B2
APPLICATION NO. : 10/154948
DATED : September 16, 2008
INVENTOR(S) : Hagin-Metzer et al.

It is certified that error appears in the above-identified patent and that said Letters Patent is hereby corrected as shown below:

Title page, Item (54), "Title", delete "THERESHOLDS" and insert -- THRESHOLDS --, therefor.

In column 1, line 2, delete "THERESHOLDS" and insert -- THRESHOLDS --, therefor.

In column 6, line 37, in Claim 2, delete "an" and insert -- a --, therefor.

In column 7, line 6, in Claim 6, delete "communications" and insert -- communicates --, therefor.

Signed and Sealed this

Second Day of December, 2008

JON W. DUDAS
*Director of the United States Patent and Trademark Office*